Sept. 14, 1948.   L. W. BARLEY   2,449,101
MULTIPLE UNIT FREEZER CABINET
Filed April 5, 1947   2 Sheets-Sheet 1
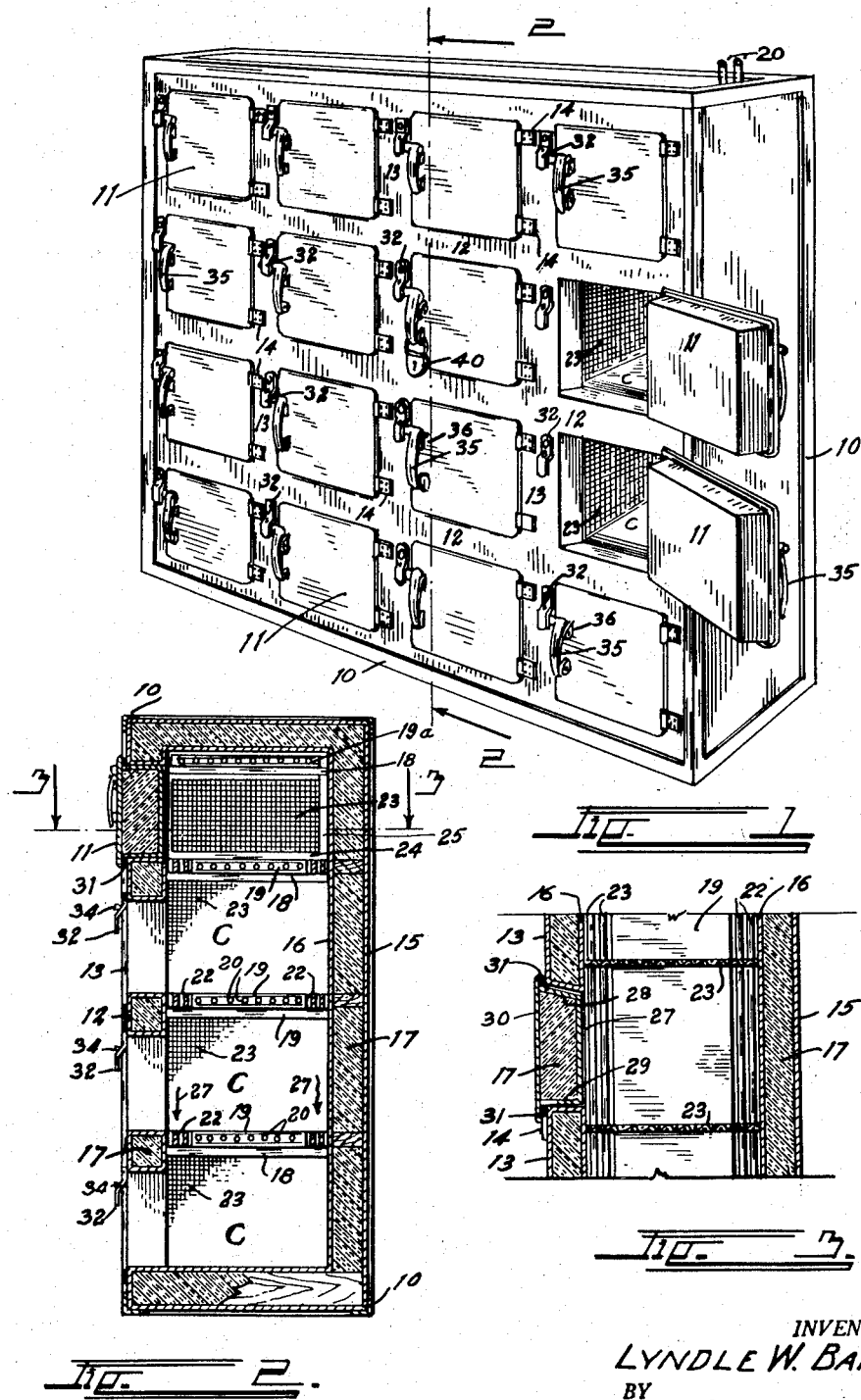
INVENTOR.
LYNDLE W. BARLEY.
BY
Martin E. Anderson
ATTORNEY.

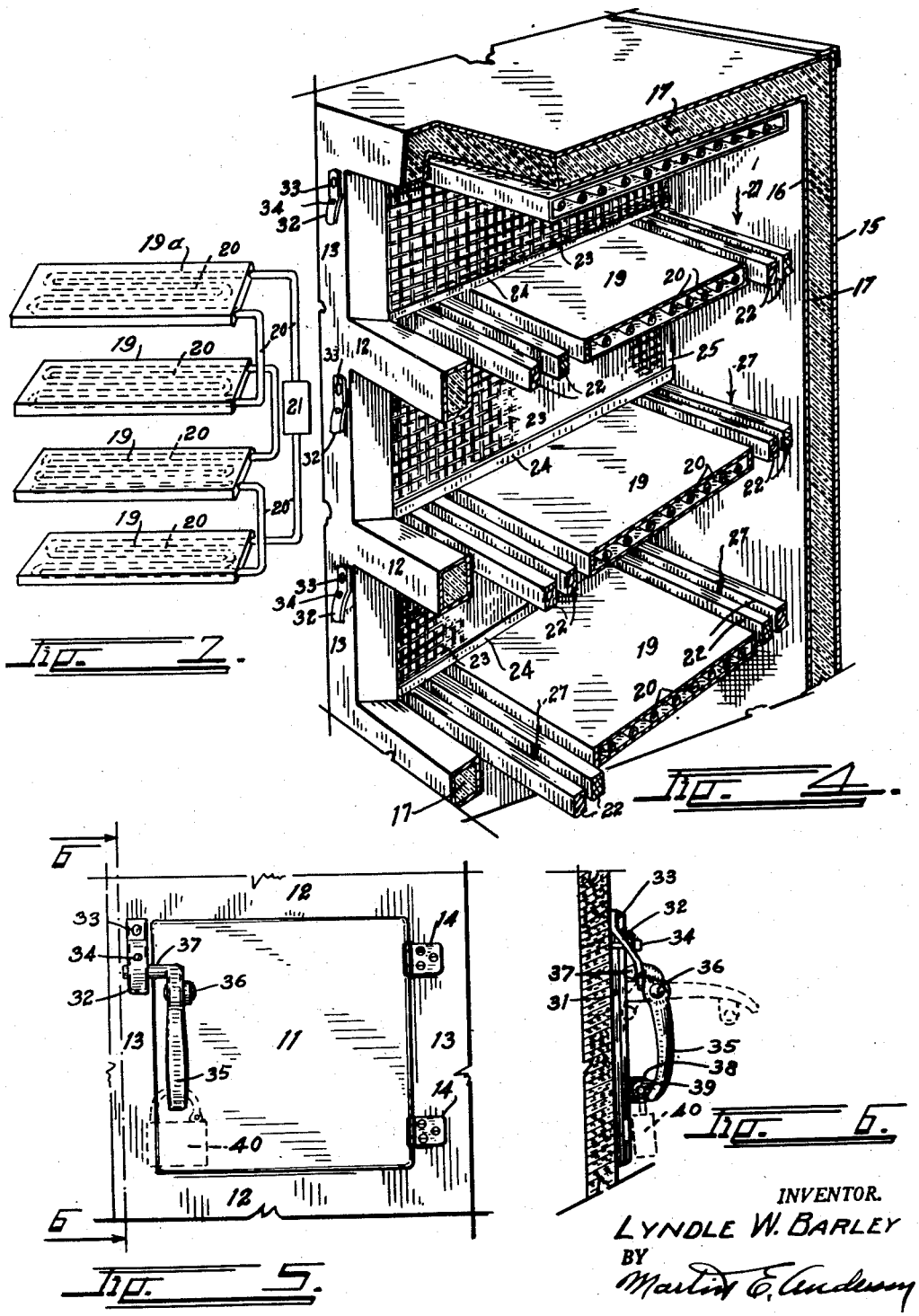

Patented Sept. 14, 1948

2,449,101

UNITED STATES PATENT OFFICE 2,449,101

MULTIPLE UNIT FREEZER CABINET

Lyndle W. Barley, Colorado Springs, Colo.

Application April 5, 1947, Serial No. 739,732

5 Claims. (Cl. 62—89)

1

This invention relates to improvements in multiple unit freezer cabinets of the type usually referred to as food lockers.

The use of freezer cabinets for the storage of food is quite popular and in many places entire buildings are devoted to the renting of food lockers to individuals who use them for preserving meats and other perishable articles.

It is customary to subject the meat and foods to a very low temperature to obtain what is commonly referred to as "quick freeze." This is accomplished by subjecting the food to a temperature of 30 or 40 degrees below zero, whereupon they freeze and solidify so quickly that there is no opportunity for the moisture contained in them to be abstracted as it usually is when food or meats are kept in an ordinary refrigerator at a temperature above freezing.

It has been customary to employ for cold storage of food entire buildings which are insulated and kept at the required low temperature, the interior of the building being divided into a large number of lockers, each one of which can be leased to an individual who controls the entry therein by suitable locks and keys. Such food lockers or storage places are objectionable for the reason that the food locker renter, when desiring access to the locker, must subject himself to the very low temperature for a considerable length of time which, especially in the summer, is highly objectionable.

The objectionable features of the ordinary storage building just described has been recognized and it is well known that lockers have now been invented and marketed in which the refrigerating apparatus is positioned within the locker cabinets so that the lockers may be kept in a well heated building.

It is the object of this invention to produce a simple and highly efficient refrigerating food locker of the type that can be positioned in a well heated building.

Another object of the invention is to reduce the cost of construction, installation and operation of the refrigerating lockers.

A still further object of the invention is to increase the capacity by utilizing the space within the locker cabinet to its fullest extent.

A still further object is to produce a multiple unit storage locker in which the temperature throughout the entire interior is maintained uniform.

Another object is to produce a construction that can be easily and quickly defrosted.

A still further object is to produce refrigerating

2 locker construction units, each of which has a plurality of individual lockers and which is so constructed that it may readily be combined with other similar units to obtain any desired capacity.

Another object is to produce a refrigerating multiple locker unit of such construction that one refrigerating machine will suffice to produce refrigeration for a large number of units.

Another object is to produce a food locker of such design and construction that standard evaporating plates or units may be employed, thereby simplifying their manufacture and decreasing the cost thereof.

The above and any other objects that may become apparent as this description proceeds are attained by means of a construction and an arrangement of parts that will now be described in detail, and for this purpose reference will be had to the accompanying drawings in which the invention has been illustrated in its preferred form, and in which:

Figure 1 is a perspective view showing the front of a multiple locker refrigerating cabinet, two of the doors being shown in open position to better disclose the construction;

Figure 2 is a section taken on line 2—2, Figure 1;

Figure 3 is a transverse section taken on line 3—3, Figure 2;

Figure 4 is a perspective view to an enlarged scale, showing a portion of the cabinet in perspective;

Figure 5 is an enlarged front view of a door;

Figure 6 is a section taken on line 6—6, Figure 5; and

Figure 7 is a diagrammatic view showing the manner in which the evaporators or freezer plates are interconnected with each other and with the compressor unit.

Referring now more particularly to Figure 1 of the drawing, reference numeral 10 designates an angle iron frame, and reference numerals 11 designate the doors to the individual freezing locker compartments. The cabinet illustrated is divided into sixteen individual compartments by horizontal wall members 12 and vertical members 13. Members 12 and 13 form the frame for the doors which are hinged to member 13 by means of suitable hinges like those designated by reference numerals 14. The doors are held in closed position by means of a lock which has been shown in greater detail in Figures 5 and 6 and which will hereinafter be described.

The actual construction of the frame work of the cabinet has not been shown as this is immaterial so far as the present invention is concerned. The walls have an outer sheet metal covering 15 and an inner sheet metal wall 16, which are separated by some approved insulating material like that designated by reference numeral 17. At each intersection of the front wall members 12 and 13, there are transversely extending wood or metal bars 18 which serve to support the evaporator plates 19. The upper evaporator plate is somewhat wider than the others and has been designated by reference numeral 19a. The evaporator or freezing plates 19 and 19a are of a well known construction and of the type shown and described in United States Patent No. 1,946,496, granted February 13, 1934. It is to be understood, however, that the invention is in nowise limited to the use of these particular evaporating or refrigerating plates, but they have certain advantages in connection with refrigerating apparatus of this type, one of which is that they may be readily defrosted by scraping the under surface with a flat scraper, thereby simplifying the defrosting of the freezer unit. The upper surface, as a rule, does not accumulate any frost because the food packages are supported thereon.

The evaporator plates that have been illustrated comprise a number of pipes 20, arranged in zigzag relation and enclosed in a box having side plates as shown. This box is evacuated for the purpose of getting good contact between the plates and the pipes, all as described in the patent above identified. A number of evaporator plates can be connected in series as shown in Figure 7 and connected with a compressor plant or unit 21. The number of units that can thus be handled by a single compressor plant is variable and depends upon the size and capacity of the refrigerating cabinet.

Referring now to Figure 4, it will be seen that the evaporator plates 19 have a width less than the width of the cabinet, leaving a space along each edge, which space is partly filled by means of longitudinally extending wood or metal bars 22. The bottom of the cabinet does not have an evaporator plate because cold air has a tendency to move downwardly and a plate at the bottom of the lowermost compartment would, therefore, not increase the efficiency of the device.

The several individual lockers or compartments have been designated by the letter "C" and are separated from the compartments above by the evaporator plates and bars 22. The separation between the compartments along the evaporator plates is effected by means of a wire screen like that designated by reference numeral 23. These screens have their edges connected with transverse and vertical bars like those designated by reference numerals 24 and 25.

It will now be seen that all of the compartments in each multiple compartment section are interconnected so that air may circulate between the compartments and therefore the inside of the entire freezer cabinet is maintained at the same temperature.

The air has, as is well known, a tendency to move upwardly when heated, and increases in specific gravity as the temperature decreases, will move upwardly until it strikes the inner surface of evaporator plate 19a, whereupon the air currents will flow downwardly along the rear and front walls as indicated by arrow 27 in Figure 4. This constant circulation of the air tends to equalize the temperature in all of the compartments and thereby produces a uniform temperature throughout.

The doors are of such construction that they have heat insulating properties equal to that of the cabinet walls, each door having an inside plate 27 secured to a frame having members 28 and 29 and are provided on their outer surfaces with a sheet metal plate 30. The insides of the doors are filled with heat insulating material 17. The sides of the doors opposite from that having the hinges is inclined as shown in Figure 3. A gasket of approved construction, like that designated by reference numeral 31, is provided between the door and the outer surfaces of the cabinet so as to prevent the movement of air, either inwardly or outwardly, about the door.

Referring now to Figures 5 and 6, it will be observed that the cabinet members 13 are provided adjacent each door with a steel bar 32 that is held in place by screws or bolts 33. These bars are curved outwardly as indicated in Figure 6 and the distance from the insides of their lower ends to the surface of the cabinet can be controlled by an adjusting screw 34. The doors are each provided with a handle 35 pivoted at 36 that have a laterally extending pin 37 at their upper ends. When the door is to be opened, and when it is shut, the handle is brought into the position indicated by dotted lines in Figure 6, whereupon pin 37 will be in position to enter underneath bar 32 and upon further downward movement of the handle, pressure is exerted on the door to force the same against the cabinet wall and compress the gasket. A washerlike member 38 is secured to the cabinet wall and another similar member 39 is secured to the handle. When the door is locked a padlock like that designated by reference numeral 40 and shown by dotted lines in Figure 5 is inserted through the openings in members 38 and 39, thereupon locking the door against unauthorized entry.

In Figure 1 a section has been shown that is divided into sixteen compartments. This, of course, is merely for illustration, as the number of compartments can be varied as desired. If a large number of compartments or individual lockers are desired, a plurality of sections like those shown in Figure 1 may be assembled end to end and it is desirable where a large number of lockers are used to place units back to back in such a manner that the doors are on opposite sides of the double units. With such a construction the rear wall may be replaced by means of a wall of any suitable material, either wood or metal and it is also possible to employ a wire screen partition between the double thickness units when used as mentioned.

Attention is directed to the fact that the evaporator units, with the exception of the upper unit 19a, are narrower than the depth of the cabinet providing spaces for air circulation at the front and back. The evaporator plates 19 form shelves on which the food packages are supported. The top plate 19a is of the same width as the cabinet interior and therefore forms a cooling surface that extends to the wall surfaces along which the cooled air moves downwardly.

The interconnection of all of the compartments "C" produces a uniform cooling temperature and assures that every part is properly cooled.

Having described the invention, what is claimed as new is:

1. A refrigerating apparatus, comprising, a cabinet having heat insulating walls, one side wall having a plurality of door openings, arranged in vertically spaced rows, a freezer plate positioned along the roof of the cabinet and other freezer plates extending horizontally between each row of door openings, dividing the interior into as many sections as there are horizontal rows of door openings, forming shelves, the freezer plates below the top plate being of less width than the cabinet, and positioned substantially centrally, providing air passages from top to bottom along the front and the rear walls, and vertical reticulated partitions positioned to separate the sections into compartments, one for each door opening.

2. A multiple compartment freezer unit, comprising, a cabinet having heat insulated walls, the front wall having a plurality of door openings arranged in spaced horizontal and vertical rows, a freezer plate arranged along the under surface of the top wall, said plate having a width equal to the distance between the front and rear walls, freezer plates extending the entire length of the cabinet, at levels substantially midway between the horizontal rows of door openings, forming supporting shelves dividing the interior into as many sections as there are door openings in each vertical row, the freezer plates below the top one being of less width than the interior width of the cabinet and positioned midway between the front and rear walls, whereby air passages are formed along the front and back walls, vertical partitions of reticulated material positioned between the vertical rows of door openings dividing each section into as many compartments as there are vertical rows of door openings, doors operatively associated with each door opening, and means for latching the doors in closed position.

3. A multiple compartment freezer unit comprising, a cabinet having heat insulated walls, the front wall having a plurality of door openings arranged in spaced horizontal and vertical rows, a freezer plate arranged along the under surface of the top wall, said plate having a width equal to the distance between the front and rear walls, freezer plates extending the entire length of the cabinet, at levels substantially midway between the horizontal rows of door openings, forming supporting shelves dividing the interior into as many sections as there are door openings in each vertical row, the freezer plates below the top one being of less width than the interior width of the cabinet and positioned midway between the front and rear walls, whereby air passages are formed along the front and back walls, vertical partitions of reticulated material positioned between the vertical rows of door openings, dividing each section into as many compartments as there are vertical rows of door openings, doors operatively associated with each door opening, means for latching the doors in closed position, and manually operable means for adjusting the force with which the latching means urges the door towards the cabinet.

4. A multiple compartment freezer unit, comprising, a cabinet having heat insulated walls, the front wall having a plurality of door openings arranged in spaced horizontal and vertical rows, a freezer plate arranged along the under surface of the top wall, said plate having a width equal to the distance between the front and rear walls, freezer plates extending the entire length of the cabinet, at levels substantially midway between the horizontal rows of door openings, forming supporting shelves dividing the interior into as many sections as there are door openings in each vertical row, the freezer plates below the top one being of less width than the interior width of the cabinet and positioned midway between the front and rear walls, whereby air passages are formed along the front and back walls, at least one supporting strip in each air passage partially closing the same, vertical partitions of reticulated material positioned between the vertical rows of door openings dividing each section into as many compartments as there are vertical rows of door openings, doors operatively associated with each door opening, and means for latching the doors in closed position.

5. A multiple unit freezer cabinet having heat insulated walls, the front wall having a plurality of vertical rows of door openings, doors hingedly connected with the cabinet wall in position to close the openings, a freezer plate secured to the under surface of the top wall of the cabinet, said plate being of the same width as the distance between the inner surfaces of the front and the rear walls, freezer plates of lesser width positioned between the horizontal rows of door openings forming supporting shelves, spaced from the front and from the rear wall surfaces, forming air passages, whereby cold air from the uppermost freezer plate may flow downwardly adjacent the wall surfaces, and vertical partitions of reticulated material dividing the sections between the freezer plates into compartments, the partitions being positioned between the vertical rows of door openings, and means for latching the doors in closed position.

LYNDLE W. BARLEY.

REFERENCES CITED

The following references are of record in the file of this patent:

UNITED STATES PATENTS

| Number | Name | Date |
| --- | --- | --- |
| 2,399,967 | West | May 7, 1946 |

UNITED STATES PATENTS

| Number | Country | Date |
| --- | --- | --- |
| 109,183 | Australia | Dec. 7, 1939 |